Patented Sept. 30, 1941

2,257,281

UNITED STATES PATENT OFFICE 2,257,281

COATING COMPOSITION

Herman A. Scholz, Evanston, Ill., assignor to United States Gypsum Company, Chicago, Ill., a corporation of Illinois No Drawing. Application December 29, 1937, Serial No. 182,247

9 Claims. (Cl. 134—46)

This invention relates to a coating composition and more particularly to a dry powdered water-paint composition. The invention has for an object the provision of a dry powdered material that is capable of being mixed with water, the resulting mixture being employed as a paint or priming coat for such surfaces as cement, plaster, lime putty, plaster board, stone, fiber boards, wood, and the like.

The coating, as a primer, provides a surface ideal for the application of most types of finishes, such as casein water paints, oil paints, enamels, lacquers, etc. It possesses the property of equalizing the suction of surfaces that are to be finished with decorative coatings. Thus, surfaces that have been repaired, patched, etc., or those that are already coated partly with gloss or lacquer paints and partly finished flat or otherwise treated, can, by the use of this composition, be finished smoothly without surface variation in color and sheen.

Various coating compositions have heretofore been proposed which have been used for priming coats on surfaces such as cement, plaster, or stone. In many instances water has been used as the vehicle in these coatings. Such water paints tend initially to adhere, to damp surfaces, better than paints containing an oil or other organic vehicles. These compositions, however, have in the past presented many serious difficulties, one of the most important being that they were not water-resistant. On becoming damp or wet, the surfaces covered with water paints described in the prior art tend to redissolve, and on re-drying become powdery or chip and flake off, thus not affording adequate protection to the covered surface.

The coating composition when used as a primer on a lime plaster or Portland cement base, particularly when such base is "hot" or fresh, acts as a lime-locking coat, since it prevents the deleterious effect of the alkalis present in "hot" bases on the organic binders present in oil paints, lacquers, etc. or upon delicate pigments which paints, lacquers, etc. may contain. When properly applied, the priming coat will prevent the formation of dark spots, fading, discoloration, and ultimate disintegration of the superimposed coating, due to the "hot" condition of the base.

Accordingly, it is a further object of this invention to provide a dry powdered composition which when dissolved in or mixed with water will form a coating composition which is waterproof and may be readily applied to surfaces of cement, plaster board, stone, or the like.

A further object of this invention is to provide a waterproof coating composition which may be used as a priming coat on surfaces previous to the application thereto of oil paints, enamels, lacquers, or varnishes.

A still further object of this invention is to provide a water-resistant coating composition which may be applied to freshly plastered walls or damp surfaces without being affected by the subsequent drying of the damp surfaces. The coating upon drying is impervious to moisture, but not to water vapor, for it permits the drying of damp bases to a proper condition for the application thereto of other coating materials.

Further and additional objects will be evident from the following description of the invention.

The dry powder composition of this invention, which may be mixed with water to produce a coating composition, contains as essential ingredients a plate-like material, as finely ground mica, an insoluble salt of a higher fatty acid, a water-soluble phosphate, and a protein binder. These ingredients are preferably finely ground and thoroughly mixed, and preferably incorporated with other substances as hereinafter indicated. The resulting composition is mixed to the desired consistency with water, preferably a short time before use, and may be applied to the surface to be coated in any desired manner such as by means of a brush or spray gun. The resulting coating after drying is hard and substantially impervious to moisture.

For a more complete understanding, a specific example is given, illustrating an embodiment of this invention, but it is of course to be understood that the invention is not to be limited thereby.

The following materials, in about the proportions indicated by weight, are finely ground and thoroughly mixed dry in any suitable manner:

| Ingredients | Preferred | Range |
|---|---|---|
| | Percent | Percent |
| Mica | 6.5 | 3–10 |
| Trisodium phosphate | 1.2 | 0.2–2 |
| Calcium stearate | 3.0 | 1–5 |
| Sodium lauryl sulfate | .3 | 0.05–0.5 |
| Casein | 10.5 | 6–15 |
| Irish moss | .5 | 0–1 |
| Borax | 2.0 | 1–3 |
| Calcium carbonate (whiting) | 30.0 | 10–50 |
| Filler, such as Portland cement, silica, etc. | 46.0 | 10–50 |
| | 100.0 | |

All of the materials are preferably free of lumps, and the resulting mixture is preferably a substantially homogeneous dry powder. In order to prepare a suitable coating composition from the above mixture, 100 parts by weight thereof may be incorporated with 60 parts by weight of water and thoroughly mixed until a smooth paste is formed. The resulting paste is preferably allowed to stand for about 30 minutes after mixing, and another quantity of 60 to 100 parts by weight of water is thoroughly mixed with the paste. The thus resulting water-paint is a thin suspension and may be applied to any type of surface such as plaster board, wood, cement, stone, and the like. A hard, water-resistant, uniform coating results on drying, over which a coating of an oil paint, lacquer, varnish, or another water paint may be applied.

As was stated hereinabove, the essential ingredients in the composition of this invention are mica, a protein binder, the phosphates, and the insoluble fatty acid salt or soap. These substances interact in a manner not completely understood to impart properties to the water-paint whereby an alkali-locking, water-resistant, horny film is formed. It is believed that the mica particles, which are plate-like in shape, lie flat and parallel to the surface covered, and thus form, by means of interlocking plates, a mechanical film over the surface. Also, the mica plates serve to bridge the irregularities and inequalities in the surface covered, and a smooth paint-receiving surface is thus obtained. The insoluble fatty acid salt or soap apparently acts to form a water-resistant and water-vapor-permeable barrier within the composition. Suitable fatty acid salts that may be used are the insoluble aluminum, calcium, magnesium, or zinc salts of any of the higher fatty acids such as stearic or palmitic acid. Fatty materials may also be used, then depending upon the reaction between any added casein solvent, lime or alkaline ingredient that may be present in the base to form an insoluble fatty acid salt.

The entire function of the phosphate in the coating is unknown. It lends unexpected spreadability and texture to the water-paint composition. It is believed that if the surface covered is lime plaster or cement, the soluble phosphate in the coating composition will react with the soluble lime or alkaline material at the surface to form the insoluble calcium phosphate. Thus the lime is prevented from passing through the coated surface. This is particularly advantageous where a subsequent coat of an oil paint, enamel or lacquer is applied on top of the primer layer. The lime, if it comes into direct contact with the hardened oil film or organic pigments of certain paints or coating compositions, will react to produce so-called "lime-burns" which are unsightly and greatly weaken the film protecting the surface. Suitable phosphates have been found to be trisodium phosphate, dipotassium phosphate, and monoammonium phosphate. Any soluble phosphate may be employed, however.

The Portland cement, silica, etc., and the calcium carbonate (whiting) in the illustration above, serve as fillers and to some extent as pigments in the coating composition. These materials are not essential, however, and other suitable fillers and pigments may be employed. For example, Portland cement, limestone dust, silica dust, ground pumice, ground asbestos, etc., may be used as fillers, while other substances such as zinc sulfide, zinc oxide, titanium dioxide, carbon black, ferric oxide, or certain organic pigments, may be employed as pigments. The Portland cement is particularly valuable as a filling material because it is readily obtainable and is already ground to the proper fineness to give desirable "tooth" to the subsequent paint film which may be applied over the coating composition.

The casein or other equivalent protein acts as a binder in the resulting coating composition. These substances, or their equivalents, are additional waterproofing agents and impart a certain degree of spreadability and adhesiveness to the coating compound. They also serve to impart hardness and lustre to the resulting finish. The casein, for example, may react with the lime of the surface being protected to form insoluble calcium caseinate. In this manner it acts similarly to the phosphates, as mentioned above. Other suitable water-insoluble proteins may be used in the place of casein, as for example certain other animal or vegetable proteins such as soy bean proteins. The Irish moss somewhat increases the consistency of the mixture when wet, and keeps the pigments and fillers in suspension.

The borax is present in the mixture described above primarily to assist in solubilizing the casein. Other solubilizing agents that may be used, however, are sodium hydroxide, sodium fluoride, etc.

It is preferable to employ a wetting agent such as sodium lauryl sulfate in the composition of this invention. The wetting agent permits the water to be more readily incorporated with the dry powdered composition and also increases the wettability of the resulting water paint, thus allowing more rapid and thorough application of the paint to the surface to be painted. It also reduces the amount of water required. Any type of wetting agent may be used, which will not chemically react with other ingredients of the coating composition but will reduce the surface tension of the water-paint in which it is used.

It is not intended that this invention be limited in any manner to the amounts or proportions of ingredients as set forth in the example given above. According to this invention, and as previously indicated, the essential ingredients of the dry composition are mica, an insoluble soap, a phosphate, and the binder. The proportions of these materials may vary within wide limits. A number of other materials such as pigments, fillers, glutenizing or binding agents, wetting agents, solubilizers, and the like are also preferably employed in the composition of this invention and may be incorporated in any desired proportions. The proportions of the various ingredients to be used may depend upon the properties desired in the resulting coating composition. Thus, for a coating composition having increased moisture resistance, the proportions of insoluble soap and glutenizing or binding agents may be increased somewhat; if lime resistance is a desideratum, the proportions of phosphates and/or protein may be increased; if the coating is to be used only as a primer, pigments need not be used or the amount may be substantially lowered; and if the coating is to be used as the finish coating, various pigments are preferably incorporated in desired quantities in order to give the surface covering the appearance desired. It is not intended that the invention be limited in any manner as to the amount of water that may be incorporated in the water-paint.

The consistency, the spreadability and the covering power may be controlled to a certain extent by the amount of water employed.

Preservative agents may be added to the water-paint, such as phenolic compounds, and the like, in order to inhibit decomposition.

Though the composition is preferably in the dry powder form, it can also be prepared in a thick, pasty form by adding a liquid, preferably water, in the desired quantity. Of course, if the filler used were the Portland cement type, then it is obvious that the pasty mass would set and harden in the container, and for that reason other gritty fillers like silica are more desirable in the composition. Likewise, in the paste form, the protein binder, particularly casein, can be successfully stabilized by following the teachings of the present inventor, as shown in his co-pending application Serial No. 4,877, filed February 4, 1935. In this manner a stable paste priming composition is obtainable, that only requires thinning with water to the desired consistency for use.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

I claim:

1. A water-paint composition comprising mica, a water-insoluble fatty acid soap, a water-soluble phosphate, and a proteid binder.

2. A water-paint composition comprising mica, a water-insoluble fatty acid soap, a water-soluble phosphate, a wetting agent, a filler, and a proteid binder.

3. A water-paint composition comprising mica, a water-insoluble fatty acid soap, a water-soluble phosphate, a filler, a non-water-soluble protein and a solubilizer for the said protein.

4. A water-paint composition comprising mica, calcium stearate, trisodium phosphate, a filler, and a protein binder.

5. A water-paint composition comprising mica, calcium stearate, trisodium phosphate, a filler, a wetting agent, and a protein binder.

6. A water-paint composition comprising mica, calcium stearate, trisodium phosphate, Portland cement, a wetting agent, casein, and a solvent for the casein.

7. A water-paint composition comprising mica, calcium stearate, trisodium phosphate, Portland cement, calcium carbonate, sodium lauryl sulfate, casein, borax, and Irish moss.

8. A waterproofing, lime-locking coating composition adapted to firmly adhere when dried to a cementitious base containing soluble lime, which comprises an aqueous slurry of mica flakes, a proteid binder, a water-soluble phosphate, and a water-insoluble fatty acid soap.

9. A dry coating composition adapted to form a waterproofing, lime-locking primer paint when suspended in water and applied to the surface of a cementitious base containing soluble lime, which comprises mica flakes, a water-soluble phosphate, a water-insoluble fatty acid soap, and casein.

HERMAN A. SCHOLZ.